April 25, 1944.   S. SCHNELL   2,347,219
ANCHOR PIN CONSTRUCTION AND ASSEMBLY METHOD
Filed Nov. 3, 1941
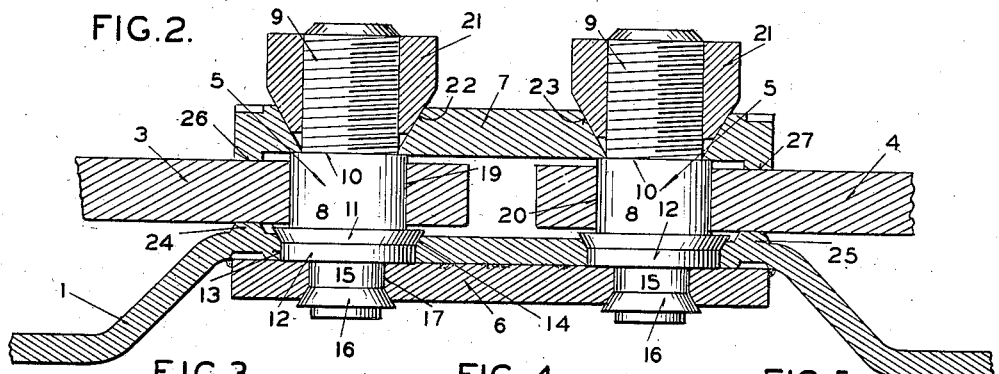
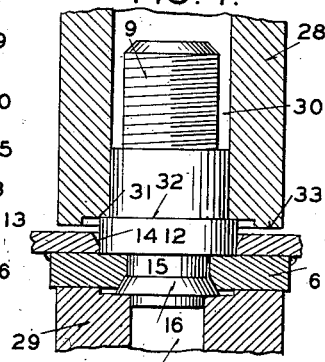
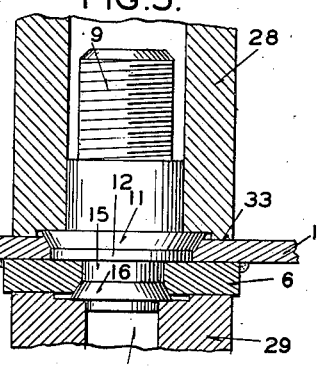
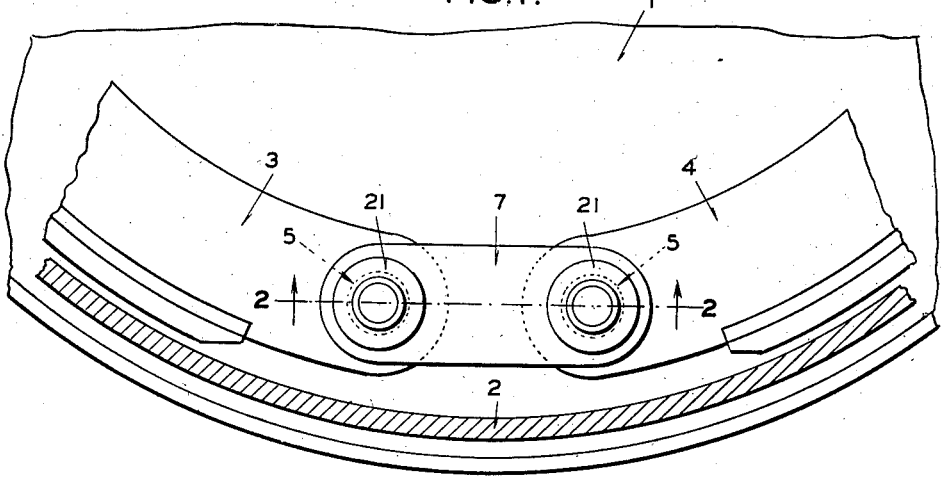
INVENTOR
STEVE SCHNELL
BY
*E. E. Huffman*
ATTORNEY Patented Apr. 25, 1944

2,347,219

UNITED STATES PATENT OFFICE 2,347,219

ANCHOR PIN CONSTRUCTION AND ASSEMBLY METHOD

Steve Schnell, Kirkwood, Mo., assignor to Wagner Electric Corporation, St. Louis, Mo., a corporation of Delaware Application November 3, 1941, Serial No. 417,593

7 Claims. (Cl. 188—205)

My invention relates to anchor pins such, for example, as those employed in brake assemblies and more particularly to their construction and the method of mounting them on a support.

One of the objects of my invention is to provide an improved anchor pin construction and method of mounting same which will result in the anchor pin being more securely fastened on its support and thus capable of transmitting greater force to the support without any yielding.

Another object of my invention is to so construct an anchor pin having a threaded portion that a means of mounting can be employed which will not result in damage to the threads during assembly.

A more specific object of my invention is to provide an improved anchoring construction for pivoted brake shoes.

Other objects of my invention will become apparent from the following description taken in connection with the accompanying drawing in which Figure 1 is a side view of a portion of a brake assembly having anchor pins constructed and assembled in accordance with the principles of my invention; Figure 2 is a sectional view taken on the line 2—2 of Figure 1; and Figures 3, 4 and 5 are sectional views showing the tools employed in and the steps of the method of assembly of the anchor pins.

Referring to the drawing in detail, I have shown my improved anchor pin construction as embodied in a braking assembly but it is to be understood that the anchor pin and its method of assembly may be employed wherever it is desired to have a pin secured to a support. As shown in Figures 1 and 2, the braking assembly comprises a support or backing plate 1 which encloses the open side of a brake drum 2 (shown in section in Figure 1). Mounted upon the backing plate are two brake shoes 3 and 4, each being pivotally mounted at its heel end on the backing plate by an anchor pin 5 constructed and assembled in accordance with my invention. The backing plate is shown as being provided with a reinforcing plate 6 preferably welded to the backing plate. There is also provided a cross-connecting plate 7 for retaining the brake shoes on the anchor pin and also serving as a means whereby one anchor pin can aid in giving support to the other anchor pin.

The body of each anchor pin 5 has a cylindrical central portion 8 and a threaded portion 9 at one end, said threaded portion being of slightly smaller diameter than the cylindrical portion 8 to thus provide a shoulder 10. Adjacent the cylindrical portion on the end opposite the threaded end is a swaged portion 11 formed from a larger cylindrical portion 12. The cylindrical portion 12 fits within an opening 13 in the backing plate and the swaged portion is received in a flared part 14 of the backing plate opening. Adjacent the larger cylindrical portion 12 is another cylindrical portion 15 having formed therefrom a swaged portion 16. The cylindrical portion 15 fits in an opening 17 in the reinforcing plate, which opening has a flared outer portion 18 for receiving the swaged portion 16. It is thus seen that when the cylindrical portions 12 and 15 are positioned in openings 13 and 14 of the backing plate and reinforcing plate and these cylindrical portions deformed to produce the swaged portions 11 and 16, the pin will be mounted securely on the backing plate.

The brake shoes 3 and 4 have their respective bearing openings 19 and 20 mounted on the central cylindrical portions 8 of the anchor pins and the connecting plate 7 is held in position against the shoulders 10 of the anchor pins by the nuts 21 on the anchor pins. The inner ends of the nuts are tapered to fit within the flared openings 22 and 23 of the connecting plate through which the threaded ends of the pins project. In order that the shoes may be held away from the swaged portions 11 of the pins, the backing plate is provided with struck-up pads 24 and 25. Also, the ends of the connecting plate 7 carry similar pads 26 and 27 for engaging the shoes to thus hold them in proper position on the anchor pins. The pads 26 and 27 are only of such height as to just engage the shoes when the connecting plate is clamped against the shoulders 10 of the anchor pins. They are not of such height as to produce any binding action to the pivoting of the shoes.

Referring now to Figures 3, 4, and 5, the method of securing the pins to the backing plate and the reinforcing plate will now be described. The assemblying operations are performed by two swaging tools 28 and 29. The swaging tool 28 has a bore 30 of a diameter to snugly fit over the cylindrical portion 8 of the anchor pin and thereby permit its end 31 to engage the shoulder 32 formed by the large cylindrical portion 12 from which the swaged portion 11 is to be produced. The end of the swaging tool is formed with an annular ridge 33 which projects slightly beyond the end of the tool. The swaging tool 29 is provided with a bore 34 which has a diameter slightly less than the diameter of the cylindrical portion 15 of the pin so that an annular portion of the end 35 of said tool will engage a portion of the end of the pin adjacent its edge. The end of tool 29 also has an annular ridge 36 projecting slightly beyond the end 35.

To secure the pin to the backing plate, the said pin is positioned as shown in Figure 3 wherein the cylindrical portion 12 lies within the opening 13 of the backing plate and the cylindrical portion 15 projects through the opening 17 in the reinforcing plate. The swaging tools are then mounted as shown. Pressure is next applied to the swaging tools. This can be done by holding one swaging tool stationary and moving the other toward it or by moving both swaging tools toward each other simultaneously. Due to the fact that the area of the pin which is engaged by the end of the swaging tool 29 is less than the area of shoulder 12 which is engaged by the end of the swaging tool 28, the swaging tool 29 will perform its swaging operation first. The outer part of the cylindrical portion 15 of the pin is shaved off and pressed into the flared portion 18 of the opening 17 to thus produce the swaged portion 16. When this swaged portion has been produced, the annular ridge 36 on the end of the swaging tool will engage the reinforcing member 6 and no more swaging operation by tool 29 will take place. Figure 4 shows the positions of the swaging tools just after swage 16 has been formed by tool 29. The pin is thus clamped to the reinforcing plate 6 between the swaged portion 16 and the shoulder 37 at the juncture of the cylindrical portions 12 and 15.

Since the swaging tool 29 is now against the reinforcing plate and shoulder 37 has a greater area than shoulder 32 which is contacted by the swaging tool 28, the swaging tool 28 will be moved relatively to the anchor pin and a part of the cylindrical portion 12 will be shaved off and forced into the flared portion 14 of the opening 13 to produce the swaged portion 11. When the annular ridge 33 of the swaging tool engages the backing plate, the swaging operation will cease. Continued pressure on the tools will cause the reinforcing plate 6 and the backing plate to be brought tightly together by the swaged portions 11 and 16 to thereby firmly secure the anchor pin to the backing plate and the reinforcing plate. The final positions of the swaging tools are shown in Figure 5.

It is to be particularly noted that during the swaging operation, swaged portion 16 is formed first, thus securely clamping the pin to the reinforcing plate and then subsequently the swaged portion 11 is formed to thereby clamp the reinforcing plate to the backing plate and also secure the anchor pin to the backing plate. This results in a more rigidly secured anchor pin than if swaged portion 11 were formed first, as under such conditions the pin would not be secured to either the backing or the reinforcing plate when the first swaged portion was formed and thus when the second swage was formed, there would be clamping force created for the reinforcing plate and the backing plate. The clamping force would be only between swaged portion 16 and shoulder 37.

It is also to be noted in connection with the anchor pin construction that the portion of the pin which is secured in the backing plate has a larger diameter than the portion of the pin upon which the brake shoe is mounted. Thus, the anchor pin is capable of withstanding greater shearing strains as they occur where the anchor pin is secured to the backing plate. The way in which the anchor pin is mounted in the backing plate also insures that the anchor pin will act as a rivet to hold the reinforcing plate to the backing plate which may become quite important if the weld should break. The method of assembly cannot in any way cause damage to the threaded portion 9 of the pin as it is received in the bore of swaging tool 28 and is not in contact with any surface.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In combination with a supporting structure provided with a stepped opening therethrough, a pin formed with stepped cylindrical portions for fitting in said opening and provided with enlarged portions on opposite sides of the supporting structure and engaging the surfaces of the structure adjacent the ends of the opening for clamping said pin thereto, the end surface of the larger cylindrical portion at the juncture of the stepped portion of the pin being held in pressure engagement with the surface at the juncture of the stepped part of the opening by the enlarged portion on the smaller portion of the pin.

2. In combination with a supporting structure provided with a stepped opening therethrough having flared ends, a pin formed with adjacent cylindrical portions fitting into said opening and having the outer ends of said cylindrical portions provided with frusto-conical enlarged portions to engage the surfaces forming the flared ends of the opening to thereby clamp the pin to the supporting structure, the end surface of the larger cylindrical portion at the juncture of the stepped portion of the pin being held in pressure engagement with the surface at the juncture of the stepped part of the opening by the enlarged portion on the smaller portion of the pin.

3. In a construction of the class described, a support provided with a stepped opening, a pin having two cylindrical portions of different diameters for fitting in the opening, the larger of which is adjacent to and of greater diameter than the pin, said cylindrical portions being of such axial lengths as to project beyond the surfaces of the support when the shoulder at their juncture engages the shoulder formed by the stepped opening, and swaged portions formed from the projecting portions of the cylindrical portions to thereby clamp the pin to the support, said swaged portions being produced by two swaging tools movable relatively toward each other by equal forces, one of said swaging tools being provided with a bore of such diameter as to receive the pin and permit its end to engage the end adjacent the periphery of the larger of the two cylindrical portions and thereby shave off some of said portion when said tool is caused to move relatively to the pin and the other swaging tool being provided with a bore of such diameter that the end of the tool will engage only the end of the other cylindrical portion adjacent its periphery and thereby shave off some of said portion when said tool is caused to move relatively to the pin.

4. In a construction of the class described, a support provided with a stepped opening and beveled surfaces forming flared ends, a pin having a threaded portion adjacent one end and two cylindrical portions of different diameters adjacent the other end for fitting in the opening, the larger of said cylindrical portions being of greater diameter than the pin, said cylindrical portions being of such axial lengths as to project beyond the surfaces of the support when the shoulder at their juncture engages the shoulder formed by the stepped opening, and swaged portions formed from the projecting portions of the cylindrical portions to cause said swaged portions to engage the beveled surfaces and clamp the pin to the support, said swaged portions being produced by two swaging tools movable relatively toward each other by equal forces, one of said swaging tools being provided with a bore of such diameter as to receive the threaded portion of the pin and permit its end to engage the end adjacent the periphery of the larger of the two cylindrical portions and thereby shave off some of said portion and cause it to engage the adjacent beveled surface when said tool is caused to move relatively to the pin and the other swaging tool being provided with a bore of such diameter that the end of the tool will engage only the end of the other cylindrical portion adjacent its periphery and thereby shave off some of said portion and cause it to engage the adjacent beveled surface when said tool is caused to move relatively to the pin.

5. In a construction of the class described, a support provided with a stepped opening, a pin having two cylindrical portions of different diameters for fitting in the opening, the larger of which is adjacent to and of greater diameter than the pin, said cylindrical portions being of such axial lengths as to project beyond the surfaces of the support when the shoulder at their juncture engages the shoulder formed by the stepped opening, and swaged portions formed from the projecting portions of the cylindrical portions to thereby clamp the pin to the support, said swaged portions being produced by two swaging tools movable relatively toward each other by equal forces, one of said swaging tools being provided with a bore of such diameter as to receive the pin and permit its end to engage the end adjacent the periphery of the larger of the two cylindrical portions and thereby shave off some of said portion when said tool is caused to move relatively to the pin and the other swaging tool being provided with a bore of such diameter that the end of the tool will engage only the end of the other cylindrical portion adjacent its periphery and thereby shave off some of said portion when said tool is caused to move relatively to the pin, the area of the surface engaged by the end of said first named swaging tool being greater than that engaged by the end of the other tool to thereby cause the said last named tool to perform its swaging operation first when pressures are applied to the tools to move them relatively toward each other.

6. In combination with a plate provided with a cylindrical opening, a second plate provided with an axially aligned cylindrical opening of smaller diameter than the opening in the first named plate and a pin having two adjacent cylindrical portions to fit the openings in the two plates and an extension portion from the larger cylindrical portion to permit the mounting of a member thereon, said pin being provided with an integral enlarged portion at the outer end of the smaller cylindrical portion for clamping the pin to the second named plate with the exposed inner end surface of the larger cylindrical portion in pressure engagement with said second named plate and said pin also being provided with an integral enlarged portion at the outer end of the larger cylindrical portion for clamping the second named plate and the pin to the first named plate.

7. In combination with a supporting plate provided with an opening, an abutting reinforcing plate provided with an axially aligned opening of smaller size than the opening in the supporting plate to thus provide a stepped opening through the two plates, and a pin having two axially adjacent portions with a shoulder at their juncture, said portions snugly fitting the openings in the supporting plate and reinforcing plate with the shoulder at the juncture of the cylindrical portions engaging the inner surface of the reinforcing plate, said pin being provided with spaced enlarged portions having pressure engagement with the outer surfaces of the plates, the enlarged portion which engages the reinforcing plate being formed prior to the other enlarged portion to thereby cause the shoulder on the pin to be drawn against and held in pressure engagement with the inner surface of said reinforcing plate and the pin to be clamped to the reinforcing plate independently of the supporting plate.

STEVE SCHNELL.